July 2, 1963
I. O. FIELDGATE ETAL
3,096,504
INSTRUMENT INDICATION SYSTEM
Filed March 14, 1961
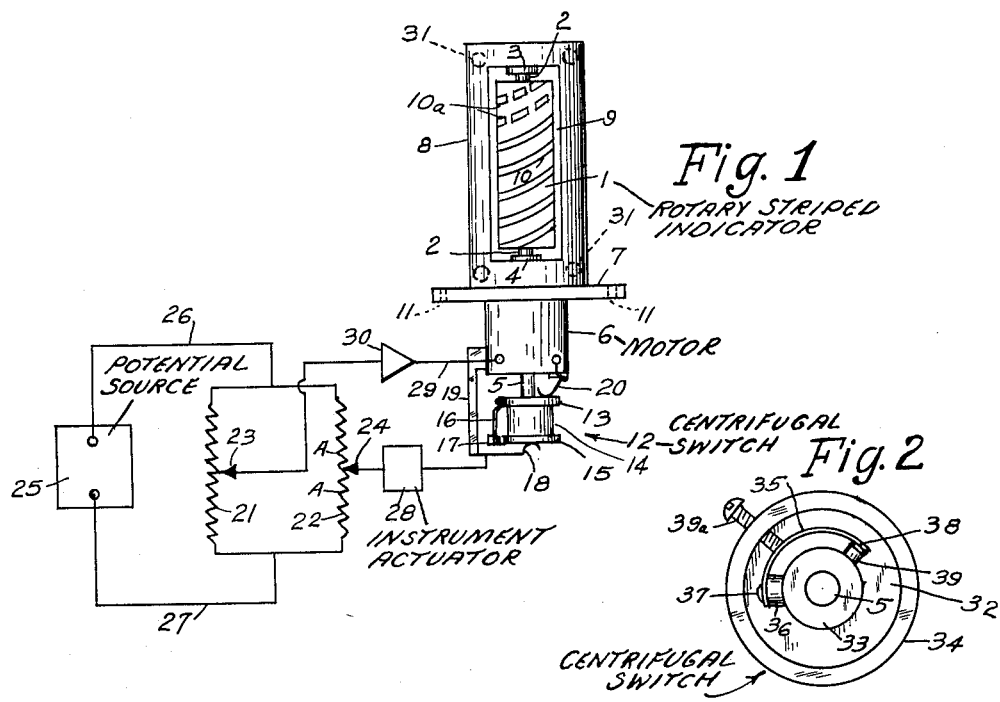
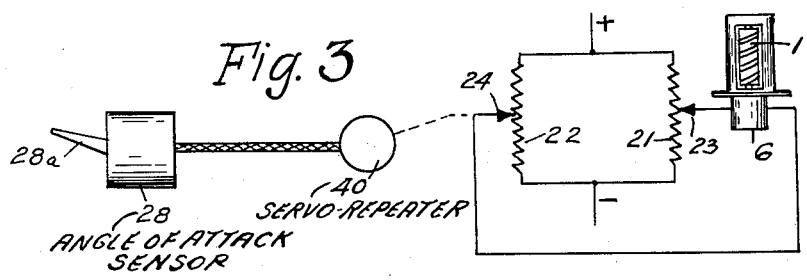
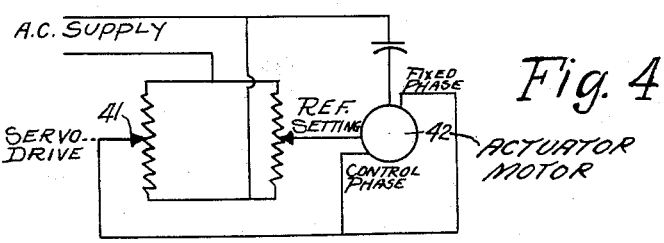
INVENTORS.
Ivan O. Fieldgate
Edward S. Gwathmey

United States Patent Office 3,096,504
Patented July 2, 1963

3,096,504
INSTRUMENT INDICATION SYSTEM
Ivan O. Fieldgate, Halesite, N.Y., and Edward S. Gwathmey, Earlysville, Va., assignors to Specialties Incorporated, Syosset, N.Y., a corporation of New York
Filed Mar. 14, 1961, Ser. No. 95,737
11 Claims. (Cl. 340—27)

This invention relates to indicating means and to instrument systems including indicating means.

In presenting visual indications of instrument measurements or determinations or of other mechanical, electrical, or similar devices, it is advantageous to use a moving or changing indicator rather than a stationary one. In this way the attention of an observer is more easily gained and, often, he can see several indications simultaneously if the presentation is adequately arranged.

In flying aircraft, as a specific example, it is frequently necessary or desirable to read the indications of several instruments virtually simultaneously or, at least, in very quick succession. This is difficult to do with prior type instruments and indicating devices and therefore we have devised novel indicating means for showing at a glance the condition or reading of various instruments or similar devices. It is, accordingly, an object of our invention to provide means for displaying graphically the indications or determinations of a broad range of instruments, measuring devices, and the like.

Another object is to provide an indicating system which will indicate visually, and effectively, the determination or responses of a plurality of instruments or other devices.

A further object is to provide indicating means for showing in degree and sense the deviation from predetermined setting of one or a plurality of devices.

An additional object is to provide indicating means and control means therefor, to limit its speed of operation in response to actuation of an associated instrument or other device.

Another object is to provide graphic indicating means to show clearly and quickly indications or responses of aircraft instruments such as angle of attack indicators, vertical speed indicators, Mach number indicators, and other instruments.

Additional objects will be evident in the following description.

In the drawings:

FIGURE 1 is an elevation of a motor driven rotary indicator having helical or "barber pole" stripes, in conjunction with a control circuit.

FIGURE 2 is a face elevation of a centrifugal cutout switch.

FIGURE 3 is a diagrammatic circuit connecting an angle of attack indicator or other device with a servo unit and associated indicator.

FIGURE 4 is a diagrammatic circuit of an alternating current system for operating an indicator.

In FIGURE 1 cylinder 1 has coaxial shaft 2 which is rotatable in upper bearing 3, and lower bearing 4 through which the shaft passes. This shaft is integral with or attached to shaft 5 of reversible direct current motor 6 which is fastened to flange 7 of housing 8 which may be of circular configuration or of any suitable shape. This housing supports bearings 3 and 4 and has a window 9 through which cylinder 1 is visible. This window may be covered with glass or transparent plastic material. Helical stripe 10 of some easily visible color or shade is arranged around cylinder 1 which may be painted white or any suitable color. The device may be attached to an aircraft or other support by means of flange 7 and bolts passing through holes 11.

Centrifugal switch 12 is fastened to motor shaft 5 by means of a key or set screw. This switch comprises annular metal ring 13 attached to annular hub or member 14 of insulating material such as epoxy, Bakelite, mica-plastic combinations, or the like. Metal disc 15 is attached to element 14 by means of cement, screws, or otherwise, as may be the ring 13. This ring is preferably not in contact with the motor shaft. One end of phosphor bronze or other spring strip 16 is fastened to the rim of ring 13 by means of a screw or rivet, or by welding, and the other end of the strip carries electrical contact 17 which also acts as a centrifugal mass. Resilient metal brush 18 makes electrical contact with disc 15 near its axis and is supported by post 19 extending from motor 6. Similar brush 20 makes contact with ring 13 and is connected with a terminal of motor 6. Contact 17 normally touches disc 15.

Resistors 21 and 22 represent two potentiometers having two respective wipers 23 and 24. The parallel-connected resistors are connected in series with potential source 25 which may provide either direct current or alternating current. Conductors 26 and 27 connect unit 25 with the potentiometers which may be separated by a considerable distance if desired.

Unit 28 may be any device which moves wiper 24 in proportion to responses of the device. This unit may be an angle-of-attack instrument, a vertical speed indicator, an air speed indicator, an altimeter or other instrument or device associated with aircraft or in other fields. Wiper 23 may be manually set so that there will be little or no unbalance current through conductor 29 connecting the wiper with the motor, when wiper 24 is in a position at a potential corresponding to the potential of wiper 23 relative to a common reference.

In operation, wiper 23 is set so that the motor 6 will not rotate when wiper 24 is in a potential-balancing position but the motor will rotate in one direction as wiper 24 is moved away from this position in one direction and the motor will rotate in opposite direction as wiper 24 is moved away from the balanced or null position in opposite direction. The rate of rotation of the motor will be in proportion to the extent of unbalance.

Assuming that instrument 28 has moved wiper 24 to produce a current through the motor windings, the motor will rotate and the "barber pole" element 1 will be rotated so that stripe 10 will appear to be moving up or down, depending upon the direction of rotation of the motor. If the unbalance of the circuit is sufficient the motor may rotate so fast that the apparent shift of the stripe 10 cannot easily be observed. The centrifugal switch 12 is arranged so that contact 17 will be thrown away from metal disc 15 by centrifugal force when the motor reaches a speed somewhat lower than that which would cause blurring of the image of the rotating strip 10. This switch will therefore break the circuit supplying current to the motor at predetermined motor speed, for either direction of rotation of the motor. This is a desirable feature and insures that the "barber pole" will be rotated within or at a maximum speed which does not produce a blurred image. Any suitable type of governor or speed limiting device can be used.

If the rotating helical stripe appears to move up it will indicate a response of instrument 28 in one sense and if the rotating stripe appears to move down it will indicate a response of instrument 28 in an opposite sense, and the rate of rotation will be a measure of the degree of response or unbalance of the circuit. The wiper 24 can be attached to or linked with the probe of an angle of attack indicator or to a suitable moving part of any instrument mentioned above, or others. The axis of element 1 may be horizontal or at any desired angle.

The display described has a number of advantages among which are that it can be made slim so that it will not abstract the view of a pilot, for instance, and it shows instantly the condition or response of the instrument or system with which it is connected. A number of such displays may be observed simultaneously.

While resistive elements are shown in the circuit it is also possible to use inductive or capacitive components. If desired, amplifier 30 may be included in the motor circuit to provide any degree of sensitivity desired.

In the event that rotation of member 1 is desired only after instrument 28 moves wiper 24 through a predetermined distance or extent on either side of its normal or null position, the resistance 22 may be non linear and may have an intermediate portion AA of relatively low resistance so that the wiper must move past one of the points A before any appreciable rotation of the motor occurs. The motor will therefore rotate only after predetermined response of the instrument 28 is exceeded. This form of the resistance is optional, however.

The member 1 may be of translucent plastic or other material and lamps may be supported within the member for illuminating it. Effective illumination may likewise be provided by electric lamps 31 supported in sockets in corners of housing 8 and connected to a generator, battery, or the like. These lamps are not visible to the observer but their light is directed against the visible portion of member 1.

The governor or centrifugal switch may be made as illustrated in FIGURE 2 in which insulating member 32 has central hub 33 attached to motor shaft 5 and outer annular portion 34 serves as a housing member. An end plate can be used to enclose the mechanism. Curved Phosphor bronze or other resilient metal strip 35 is attached to boss 36 which is integral with element 33; screw or rivet 37 being used as a fastener. The other end of strip 35 carries electrical contact 38 adapted normally to touch contact 39 imbedded in insulating element 33. These contacts are connected with slip rings not shown. Screw 39a may be threaded through rim 34 and may be turned to vary tension in spring member 35 in order to adjust the speed setting for opening of the contacts. After the motor shaft reaches predetermined speed centrifugal force will cause the contacts to separate and so to break the motor energizing circuit.

As shown in diagrammatic FIGURE 3, like numerals are used to indicate equivalent parts as in FIGURE 1. The instrument 28 is shown as an angle of attack sensor having probe 28a which is moved to produce an electrical output corresponding to the angle of attack. The movable probe may displace or rotate the wiper of a potentiometer or a servo unit such as a self synchronous motor or other device. The output of unit 28 is fed to servo repeater 40 which then actuates wiper 24 of a potentiometer connected in a circuit similar to that shown in FIGURE 1. The servo unit makes possible an amplification of power and is practicable for remote operation and control. The circuit indicated in FIGURE 3 may be operated by direct current as indicated.

In FIGURE 4 is shown a circuit suitable for operation with alternating current. A fixed phase and a control phase are supplied to a suitable indicator as marked. The phases can be made to buck or cancel for normal position of the servo drive 41 but there will be a net phase voltage to drive motor or instrument 42 when there is unbalance in the circuit.

It has been demonstrated that knowledge of angle of attack is of great assistance in flying and other instrument determinations such as altitude, air speed, vertical speed and the like are also important. Ordinarily it is very difficult to read the indications of a number of instruments simultaneously and this is particularly difficult during take-off and landing operations at which times such instrument indications are of greatest importance. We have therefore devised a readily observable instrument and instrument system which will be of much assistance to aircraft pilots and to others who may need to know the indications of a plurality of instruments quickly.

For instance, these indicators and instruments controlling them may be used in motor vehicles, atomic energy installations, and in other installations in which critical conditions exist or in which quick judgments are required.

In FIGURE 1 the portion AA of resistor 22 may comprise numerous turns or may be of relatively high resistance, rather than the opposite. Then the bridge will be sensitive to very small changes of the setting or adjustment of wiper 24 and the unbalance current of the bridge will be widely varied for relatively small responses of instrument 28 so that member 1 will quickly show small changes of bridge unbalance and will be rotated by motor 6 at speeds in proportion to the magnitude of change.

Likewise, amplifier 30 may be of a type producing relatively greater amplification for small unbalance currents than for larger currents, to provide quick responses of the motor for small changes in instrument 28 and wiper 24. Such amplifiers are known and may easily be arranged by employing negative feedback in circuits including electronic amplifier tubes, transistors, or the like. The negative feedback may be used also to limit the maximum speed at which the motor will rotate.

The stripe 10 need not be truly helical but can be varied. One modification is shown at 10a in FIGURE 1, in which the stripe is broken into relatively short lengths. This type of stripe is easily visible, especially when rotating. Many other modifications may be made readily.

What we claim is:

1. In an instrument system, a rotatable member having a helical stripe therearound, electrical means for rotating said member, electrical bridge means connected with said electrical means for controlling current supplied thereto, means for supplying current to said bridge means, and an instrument connected with a member of said bridge means for producing electrical unbalance therein in accordance with responses of said instrument.

2. The instrument system as set forth in claim 1, said bridge member comprising a potentiometer.

3. In an instrument system, a rotatable member having a helical stripe therearound, a reversible electric motor for rotating said member in either of two directions, an electrical bridge comprising a first potentiometer having a first settable wiper and a second potentiometer having a second wiper, means for supplying current to said bridge, an electrical conductor connecting said first wiper to one terminal of said motor, an electrical conductor connecting said second wiper to another terminal of said motor, and an instrument connected with said second wiper for displacing said wiper from a null position thereof in accordance with responses of said instrument.

4. The instrument system as set forth in claim 3, said instrument including a device responsive to angle of attack in an aircraft.

5. The instrument system as set forth in claim 3, and including means for limiting the speed of rotation of said motor.

6. In an instrument system, a rotatable member having a helical stripe thereon, a reversible motor connected with said member for rotating it, an electrical bridge comprising a first impedance element and a settable electrical connector therefor and a second impedance element and an adjustable connector therefor, means connected with said bridge for supplying current thereto, an instrument connected with said adjustable connector for causing adjustment thereof in accordance with responses of said instrument, means electrically connecting said settable connector with one terminal of said motor, means electrically connecting said adjustable connector with another terminal of said motor, and centrifugally operated switch means rotated by said motor for controlling current thereto.

7. The instrument system as set forth in claim 6, and including a housing for said rotatable member, said housing having a window therein, for observation of said rotatable member therethrough.

8. In an instrument system, in combination, a rotatable member having a helical stripe therearound, means mounting said member for rotation, a reversible motor connected with said member for rotation thereof, electrical bridge means connected with said motor for supplying current thereto upon unbalance of said bridge, and an angle of attack sensing instrument connected with an element of said bridge to cause unbalance thereof when the response of said angle of attack instrument varies in predetermined degree.

9. In an instrument system, in combination, a rotatable member having a generally helical stripe therearound, at least a portion of said stripe comprising a plurality of spaced marks, means mounting said member for rotation, a reversible electromagnetic device connected with said member for causing rotation thereof, electrical bridge means connected with said electromagnetic device for supplying current thereto upon unbalance of said bridge, and an instrument connected with an element of said bridge to cause unbalance thereof, when the response of said instrument is changed.

10. The instrument system as described in claim 1, and including means for varying the ratio of electrical current supplied to said electrical means to the degree of unbalance of said bridge means.

11. In an instrument system, a rotatable member having a generally helical stripe therearound, electrical means for rotating said member, electrical circuit means connected with said electrical means for controlling current supplied thereto, means for supplying current to said circuit means, and an instrument connected with a member of said circuit means for producing electrical unbalance therein in accordance with responses of said instrument.

References Cited in the file of this patent

UNITED STATES PATENTS

| | | |
|---|---|---|
| 2,293,502 | Hermann | Aug. 18, 1942 |
| 2,426,245 | Skellett | Aug. 26, 1947 |